STEREOPHONIC SYSTEM

Filed Oct. 31, 1960 6 Sheets-Sheet 1

INVENTOR:
ROBERT B. DOME,
BY Donald N. Timbie
HIS ATTORNEY.

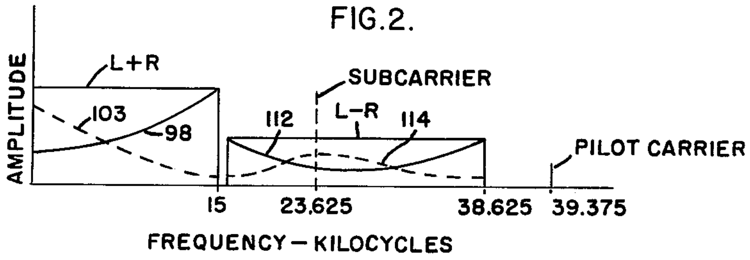
FIG.2.
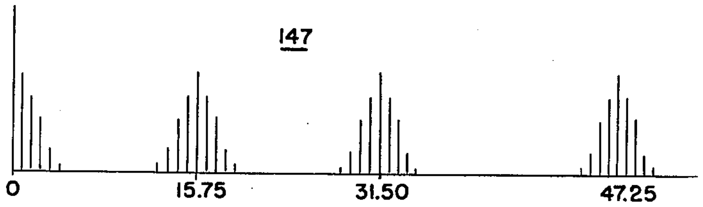
INVENTOR:
ROBERT B. DOME,
BY Donald M. Timbie
HIS ATTORNEY.

July 30, 1963 R. B. DOME 3,099,707

STEREOPHONIC SYSTEM

Filed Oct. 31, 1960 6 Sheets-Sheet 3

INVENTOR:
ROBERT B. DOME,

BY Donald N. Timbie
HIS ATTORNEY.

INVENTOR:
ROBERT B. DOME,
BY Donald N. Timbie
HIS ATTORNEY.

July 30, 1963 R. B. DOME 3,099,707

STEREOPHONIC SYSTEM

Filed Oct. 31, 1960 6 Sheets-Sheet 5

INVENTOR:
ROBERT B. DOME,

BY Donald N. Timbie
HIS ATTORNEY.

July 30, 1963 R. B. DOME 3,099,707

STEREOPHONIC SYSTEM

Filed Oct. 31, 1960 6 Sheets-Sheet 6

INVENTOR:
ROBERT B. DOME,

BY Donald N. Timbie
HIS ATTORNEY.

United States Patent Office 3,099,707

Patented July 30, 1963

3,099,707

STEREOPHONIC SYSTEM

Robert B. Dome, Geddes Township, Onondaga County, N.Y., assignor to General Electric Company, a corporation of New York Filed Oct. 31, 1960, Ser. No. 66,306
6 Claims. (Cl. 178—5.6)

Figure 1:
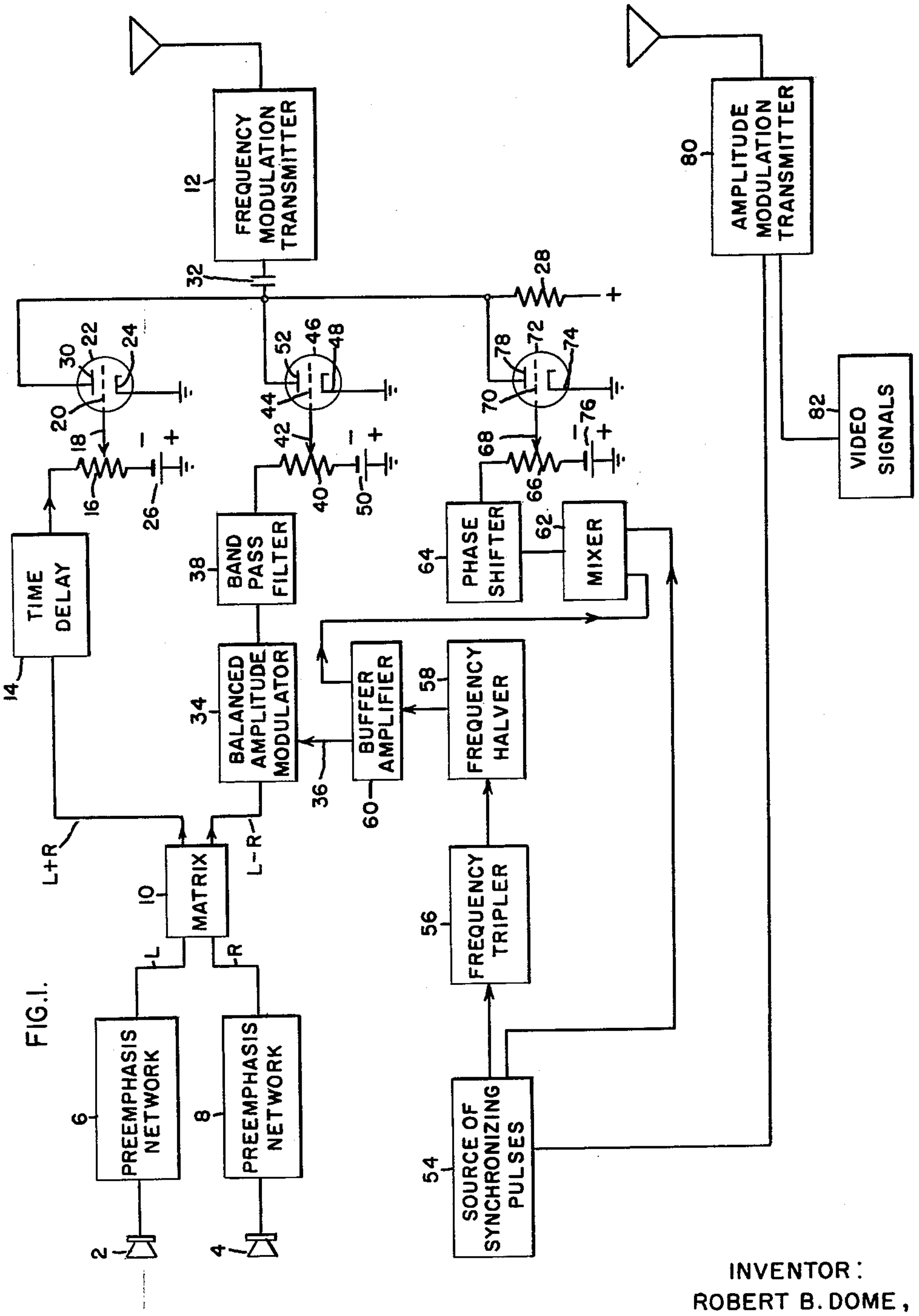

This invention relates to an improved stereophonic system especially adapted for use in television.

In accordance with the television transmission standards presently approved by the Federal Communications Commission of the United States, the picture or video information is transmitted by amplitude modulation of a video carrier and the audio information is transmitted by frequency modulation of an audio carrier. In the stereophonic sound transmission system described in my co-pending application Serial No. 66,277 filed on October 31, 1960, entitled Compatible TV and FM Stereophonic System, and assigned to the same assignee as this application, a portion of the audio intelligence is transmitted in the usual manner by frequency modulation of the audio carrier in order that it can be reproduced by standard receivers. Instead of modulating the frequency of the audio carrier directly with the remaining portion of the audio information, it is first applied so as to modulate the amplitude of a subcarrier, and only the modulation components or sidebands thus produced are applied so as to modulate the frequency of the audio carrier, the subcarrier itself being suppressed so as not to affect the frequency of the audio carrier. A standard television receiver is unaffected by these sidebands because their lowest frequency is above the highest audio frequency that it is designed to accommodate.

In a system where the subcarrier is suppressed, some means must be provided for regenerating it at the receiver with proper phase and frequency. As set forth in the above identified application, this is accomplished by making the frequency of the subcarrier equal to a harmonic of the line scanning frequency because then the subcarrier can be derived from the line synchronization pulses which are necessarily transmitted.

Although this system works very well, it has been found that when television receivers of the intercarrier sound type are used, and practically all receivers manufactured today are of this type, video components appear in the audio signals recovered from the sidebands of the subcarrier. The presence of these video components in the audio signals produces undesirable interference in the detected audio signals.

It is an object of this invention to provide a stereophonic system for use in television wherein the video components appearing in the audio signal are greatly reduced.

This objective is accomplished by selecting a subcarrier frequency that lies between the line scanning frequency and its second harmonic, or between any two successive harmonics. In order to detect the audio information represented by the amplitude modulation sidebands, it is essential that the subcarrier regenerated at the receiver have the same phase with respect to the sidebands as the subcarrier which was modulated at the transmitter. While a subcarrier of the proper frequency can be regenerated from combinations of the line synchronizing components, it will be found that there is an ambiguity in its phase i.e. sometimes it has the proper phase and sometimes it is out of phase. As it would be impractical to provide the user with means for reversing the phase whenever it happened to be incorrect, it is highly desirable that the system operate in such manner that the phase of the subcarrier regenerated at the receiver is always correct. In accordance with this invention, this is accomplished by transmitting a pilot carrier in the form of a frequency modulation of the audio carrier, which pilot carrier is of such frequency that it can be combined at the receiver with the frequency of the line synchronizing pulses or one of its harmonics so as to produce a subcarrier of the desired frequency and phase.

Accordingly it is another object of this invention to provide a means for regenerating the subcarrier at the receiver without ambiguity in phase.

The manner in which the above objectives are achieved in accordance with this invention will be more clearly understood from the following detailed description in conjunction with the drawings in which FIGURE 1 illustrates in block diagram form a transmitter embodying the principle of this invention, FIGURE 2 is a graphical representation of the type of signal transmitted by the system as well as the distribution of video components.

Figure 3:
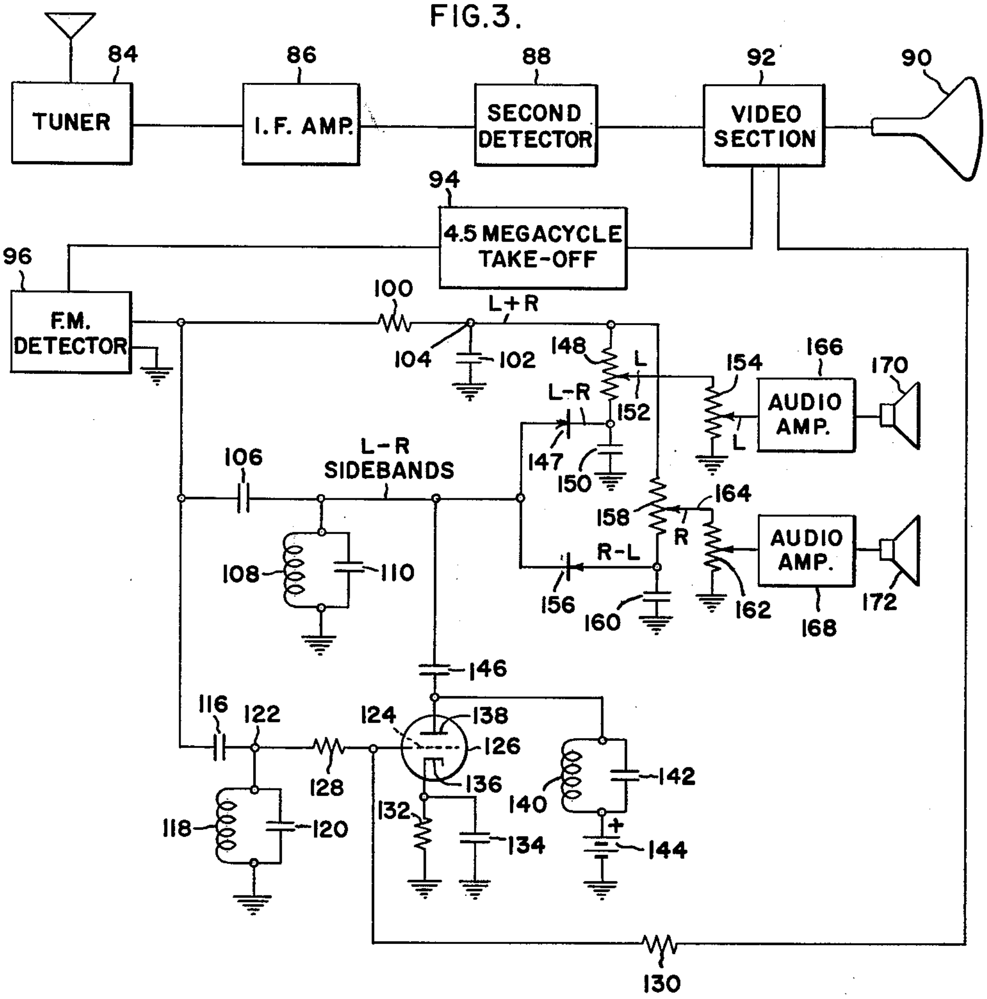
Figure 4:
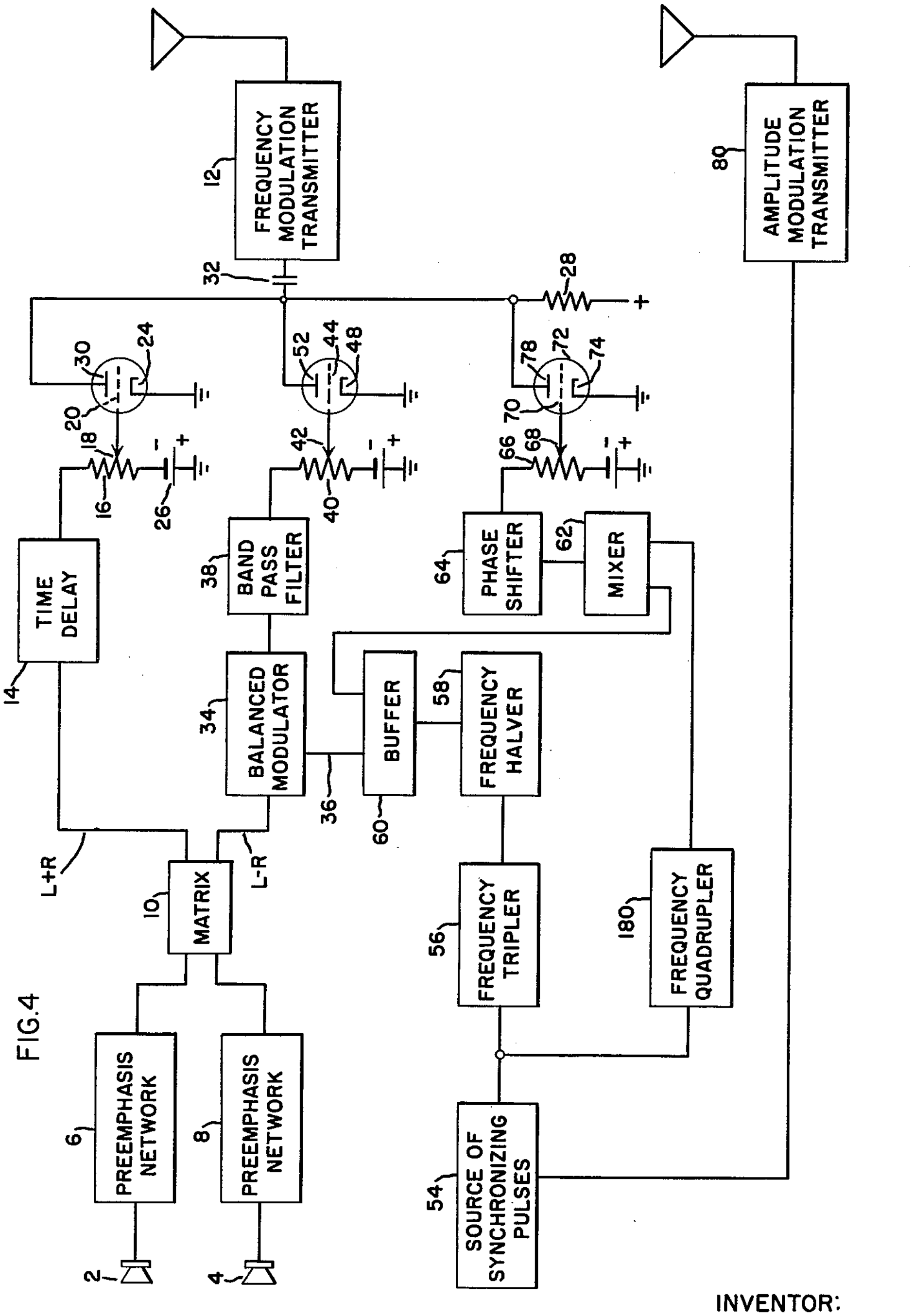
Figure 5:
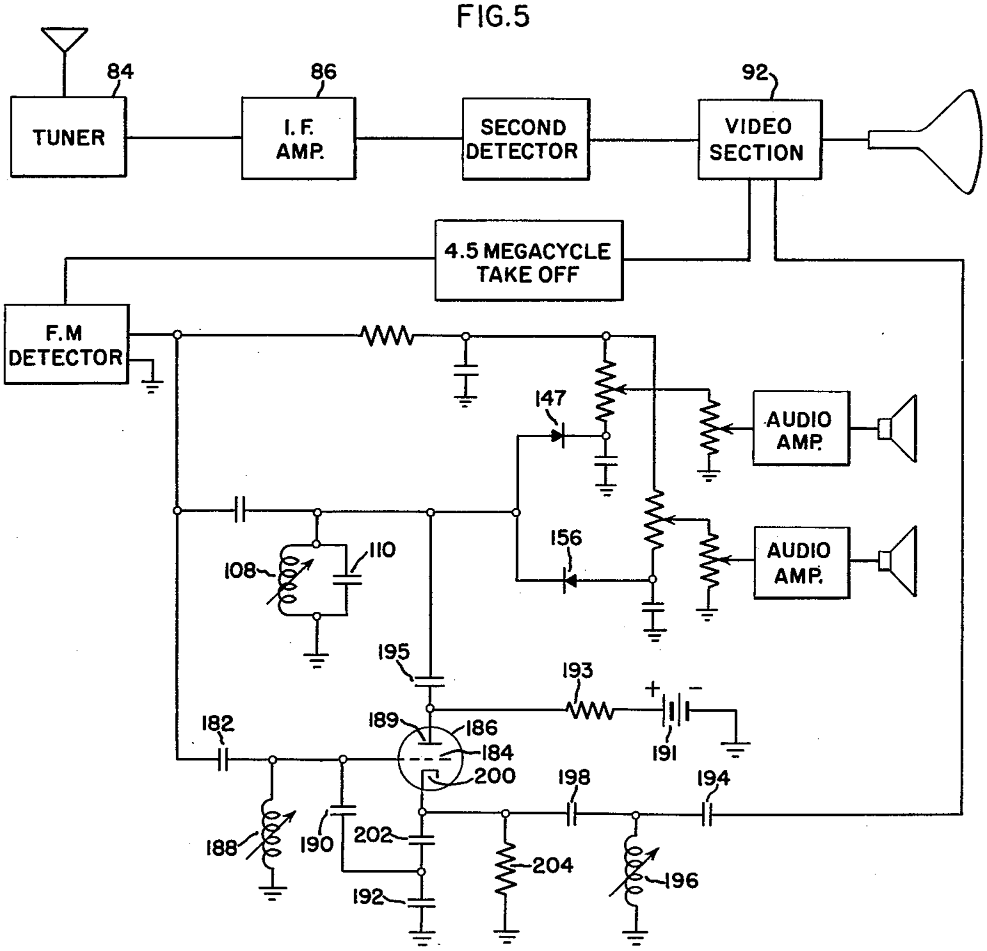
Figure 6:
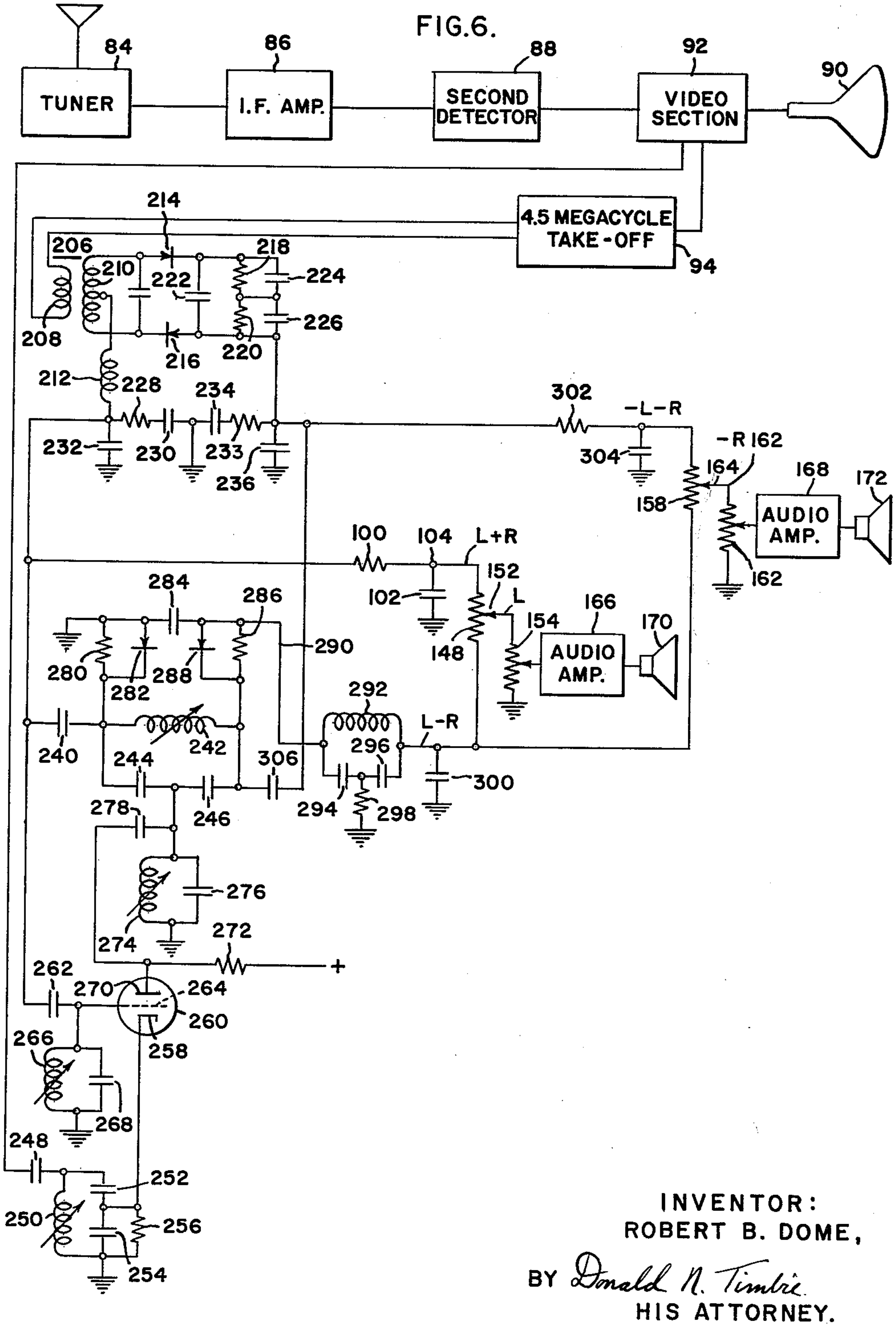

FIGURE 3 is a diagram illustrating a receiver embodying the principles of this invention, FIGURE 4 is a diagram illustrating another transmitter embodying this invention, FIGURE 5 is a diagram of a receiver embodying this invention in which the subcarrier is derived from the pilot carrier and the fourth harmonic of the line scanning frequency, and FIGURE 6 is a diagram of a receiver embodying the principles of this invention in which a balanced detector is used to derive the $L-R$ signal.

In the following description of various embodiments of the invention, certain frequencies will be mentioned in order to explain more clearly the application of the principles of this invention to the presently standardized television system. As will appear, however, other frequencies could be used in this system as well as in other systems, and it is the relationship between the various frequencies that is significant.

Reference is now made to FIGURE 1 which illustrates a television transmitter embodying the principles of this invention. A left microphone 2 and a right microphone 4 supply audio signals to preemphasis networks 6 and 8 which increase the amplitude of the audio signals as their frequency increases. Preemphasis of the audio signals is required by the present transmission standards and therefore all receivers contain a deemphasis network which reduces the amplitude of the audio signals with frequency so as to restore the high and low frequencies to the relative amplitude they had before application to the preemphasis networks 6 and 8. If preemphasis were not required by the present standards, the present invention would provide useful advantages, but as will be explained below, the present invention provides even better results when preemphasis is present.

The preemphasized audio signals L and R appearing at the outputs of the networks 6 and 8 are applied to a matrix 10 which provides in a well known manner the sum of the signals L and R, i.e., $L+R$, at one output and their difference, i.e., $L-R$, at another. In a manner to be explained the $L+R$ signal is applied so as to modulate the frequency of the audio carrier, and therefore standard receivers can recover this signal. However, the $L-R$ signal lies in the same frequency range as the $L+R$ signal and in order to transmit it in such manner that it does not interfere with standard receivers and so that it may be separated on a frequency basis from the $L+R$ signal by receivers constructed in accordance with this invention, means are provided for translating its frequency range to a portion of the spectrum not occupied by the $L+R$ signal.

The $L+R$ signal is applied to a frequency modulation transmitter 12 in the following manner. For reasons to be explained the $L+R$ signal at the output of the matrix 10 is applied to a time delay means 14 and thence to one end of a potentiometer 16 having a moveable contact 18 connected to a grid 20 of an adder amplifier 22. Bias for the grid 20 may be provided by connecting the cathode 24 to ground and by inserting a source of direct current potential, such as a battery 26, between the other end of the potentiometer 16 and ground with the polarity shown. A load impedance, here shown as a resistor 28, is connected between the anode 30 of the amplifier 22 and a source of positive potential, and the $L+R$ signal appearing across this resistor is coupled via a blocking capacitor 32 to the frequency modulation transmitter 12.

In order to translate the frequency range of the $L-R$ signal appearing at the other output of the matrix 10, the $L-R$ signal is applied so as to modulate the amplitude of a subcarrier provided via a lead 36 in a manner to be explained. The frequency of the subcarrier may be 23.625 kilocycles, i.e., half way between the line scanning frequency of 15.75 kilocycles and its second harmonic of 31.5 kilocycles. As will subsequently appear, the frequency of the subcarrier may be anywhere between these latter frequencies, but the most advantageous frequency is at or near the mid point. As is well understood by those skilled in the art, the output of the modulator 34 contains the sidebands produced by the amplitude modulation process but does not include the subcarrier itself. A band pass filter 38 coupled to the output of the modulator 34 attenuates frequencies below the highest frequency of the $L+R$ signal, which may be determined by the design of preemphasis networks 6 and 8, the matrix 10 or by a separate filter in the $L+R$ channel. In this particular example the lower limit of the band pass filter 38 could be at 15.625 kilocycles or 8 kilocycles below the subcarrier frequency of 23.625 kilocyles. The upper limit of the band pass filter 38 could be at 31.625 kilocycles or 8 kilocycles above the subcarrier frequency. If such is the case, a low pass filter having an upper frequency limit of 8 kilocycles could be inserted in the $L-R$ output of the matrix 10. However, if it is desired that the upper sideband of the subcarrier be wider than the lower sideband, a band pass filter such as 38 can be used in which event its upper limit should be at a frequency below a pilot carrier which will, in this example, have a frequency of 39.375 kilocycles. It is only necessary therefore that means are provided for preventing the lowest frequencies of the sidebands appearing at the output of the modulator 34 from being below the highest frequency of the $L+R$ signal and for preventing the highest frequency of these sidebands from being so close to the pilot carrier frequency as to make its separation difficult.

In the example illustrated, the output of the bandpass filter 38 is connected to one end of a potentiometer 40 having a movable contact 42 which is connected to a grid 44 of an adder amplifier 46. Negative bias for the grid 44 may be provided by connecting the cathode 48 to ground and by inserting a source of negative potential such as a battery 50 between the other end of the potentiometer 40 and ground with the polarity shown. The anode 52 of the amplifier 46 is connected to the common load resistor 28, and the sidebands representing the $L-R$ signal are therefore applied to the frequency modulation transmitter 12.

Various ways of generating the subcarrier applied to the modulator 34 via the lead 36 may be used, but one effective way is as follows. All television transmitters contain a source at which synchronizing pulses or voltages of line scanning frequency may be derived, and this point has been designated by the numeral 54. In accordance with present standards this frequency is 15.75 kilocycles. By connecting any suitable frequency tripler 56 and a frequency halver 58 in series with the output of the source 54, the desired subcarrier frequency of 23.625 kilocycles will be produced. This is effectively a sine wave or single frequency by virtue of the tuned circuits customarily used in frequency multipliers and dividers. The subcarrier appearing at the output of the frequency halver 58 is applied to a buffer amplifier 60 and thence to the lead 36.

Another way of generating the subcarrier would be by means of an oscillator that is not controlled by the line synchronizing pulses, in which case the frequency of the subcarrier could be adjusted to any frequency between the repetition frequency of the line synchronizing pulses and their second harmonic, but unless it is precisely at the mid frequency certain low frequency beat notes are produced. Therefore, it is highly desirable that means are provided for generating a subcarrier having a frequency that is precisely at the mid point, i.e., 23.625 kilocycles under the present standards. Of course where the subcarrier is derived from and therefore dependent on the line synchronizing pulses, any variation in their frequency will change the frequency of the subcarrier so that it is always at the mid point as desired.

In accordance with this invention, it is necessary to transmit a pilot carrier of such frequency that it can be combined at the receiver with a wave of line scanning frequency or one of its harmonics so as to produce the subcarrier frequency. In the particular arrangement shown in FIGURE 1 the pilot carrier is derived by applying the subcarrier of 23.625 kilocycles appearing at the output of the buffer amplifier 60 to a mixer 62 wherein it is mixed with the line synchronizing pulses from the source 54. For reasons well understood by those skilled in the art the mixing process produces the sum of the frequencies, 39.375 kilocycles, as well as the difference between them, 7.875 kilocycles. By well known design technique the 39.375 kilocycle output can be selected and applied to a means 64 for adjusting the phase of the pilot carrier wave. The purpose of the phase adjuster 64 is to time the crests of the 39.375 kilocycle pilot carrier to take into account the variations in delays encountered in the filter 38 and the mixer 62. The output of the phase shifting means 64 is applied to one end of a potentiometer 66 having a variable contact 68 connected to a grid 70 of an adder amplifier 72. Bias for the grid 70 is provided by grounding the cathode 74 and inserting a source of direct current potential such as the battery 76 between ground and the other end of the potentiometer 66 with the polarity shown. An anode 78 of the amplifier 72 is connected to the low voltage side of the load resistor 28 with the result that the pilot carrier is applied to the frequency modulation transmitter 12.

Inasmuch as the present invention is directed to the audio portion of the television system the video portion is generally indicated by an amplitude modulation transmitter 80 to which synchronizing pulses from the source 54 as well as video signals from the source 82 are applied.

FIGURE 2 illustrates the frequency ranges of the signals just discussed prior to their application to the frequency modulation transmitter 12. In this example the $L+R$ signal lies below 15 kilocycles, the sidebands representing the $L-R$ signal lie between 15 and 38.625 kilocycles, and the pilot carrier is at 39.375 kilocycles.

In the intercarrier sound television receiver of FIGURE 3, a tuner 84 converts the audio and video carriers of any station to the same respective intermediate frequencies. These are amplified by the intermediate frequency amplifier 86 and detected by a second detector 88. Inasmuch as this invention relates to the audio portion of the receiver, the circuits necessary for producing an image on a cathode tube 90 are all included in a video section 92 which is connected between the detector 88 and the tube 90. As is well known by those skilled in the art, an intercarrier sound television receiver contains points, such as at the output of a video amplifier, where the beat frequency between the frequency modulated audio carrier and the video carrier, generally termed the audio I.F., may be derived by a trap circuit 94 or the like. In the presently standardized system, the frequency separation between the video and audio carriers is 4.5 megacycles, and as the frequency of the audio carrier increases and decreases in accordance with the signal applied to the modulator of the transmitter 12 of FIGURE 1, the frequency of the audio I.F. increases and decreases by the same number of cycles about a center frequency of 4.5 megacycles. If it were not for the special design of the intermediate frequency amplifier 86, the amplitude of the 4.5 megacycle audio I.F. would vary radically in accordance with the amplitude modulation of the video carrier which represents the video and synchronizing information, but even with such special design some video amplitude modulation remains.

Recovery of the $L+R$ signal, the $L-R$ sidebands and the pilot carrier which were applied so as to vary the frequency of the audio carrier of the transmitter 12, and which are represented in the upper portion of FIGURE 2 is performed by applying the audio I.F. provided by the 4.5 megacycle takeoff 94 to a frequency modulation detector 96. In FIGURE 2 the curve 98 approximates in a qualitative manner the relative preemphasis of the $L+R$ signal produced by the preemphasis networks 6 and 8 in the transmitter of FIGURE 1. A deemphasis network comprised of a resistor 100 and a capacitor 102 produces a reduction in the higher frequencies, as qualitatively indicated by the dotted line 103 of FIGURE 2, with the result that the various frequencies within the $L+R$ signal are restored to the relative amplitudes they had at the outputs of the microphones 2 and 4. This network also performs another important function; namely it prevents any signals of higher frequency, such as the $L-R$ sidebands and the pilot carrier, from appearing with the $L+R$ signal at the junction 104.

Separation of the $L-R$ sidebands may be achieved by coupling the output of the detector 96 via a capacitor 106 to the ungrounded side of a parallel circuit comprised of an inductor 108 and a capacitor 110 which have such values as to produce resonance at the subcarrier frequency of 23.625 kilocycles. Now the preemphasis networks 6 and 8 at the transmitter preemphasize the higher frequencies of the L and R signals with the result that the $L-R$ sidebands are preemphasized on either side of the subcarrier frequency as qualitatively represented by the solid curve 112 of FIGURE 2. By suitable selection of the Q of the resonant circuit 108, 110, it is possible to deemphasize the sidebands as qualitatively indicated by the dotted curve 114. Hence, after the $L-R$ signal is detected from the $L-R$ sidebands, the various frequencies within the $L-R$ signal will have the same relative magnitudes as in the L and R signals supplied by the microphones 2 and 4 of FIGURE 1. This action also separates the $L-R$ sidebands from the $L+R$ signal and the pilot carrier.

The pilot carrier of 39.375 kilocycles may be separated from the other signals appearing at the output of the detector 96 by coupling the output via a capacitor 116 to the ungrounded side of a parallel circuit comprised of an inductor 118 and a capacitor 120 having such values as to produce resonance at the frequency of the pilot carrier. The Q of the resonant circuit 118, 120 is extremely high so as to prevent any of the $L-R$ sidebands from appearing at the junction 122. The pilot carrier is coupled to a grid 124 of a mixing amplifier 126 via an isolation resistor 128. Line synchronizing pulses or a voltage of line scanning frequency are derived from any suitable point in the video section 92 and coupled via an isolation resistor 130 to the grid 124. Bias for the mixing amplifier 126 may be supplied by a cathode resistor 132 and a parallel capacitor 134 connected between cathode 136 and ground. The application of the pilot carrier and the line synchronizing pulses to the grid 124 causes a mixing action which, as is well known by those skilled in the art, produces at the anode 138 the sum and difference frequencies that is, frequencies of 23.625 kilocycles and 55.125 kilocycles. The desired subcarrier frequency of 23.625 kilocycles may be selected by connecting a parallel circuit, comprised of an inductance 140 and a capacitor 142, between the anode 138 and a source of operating positive potential, herein indicated as being a battery 144. The parallel circuit 140, 152 is tuned to resonance at the subcarrier frequency of 23.625 kilocycles.

The subcarrier thus derived is coupled via a capacitor 146 to the ungrounded side of the parallel resonant circuit 108, 110 with the result that the signal appearing across the resonant circuit 108, 110 includes the $L-R$ sidebands as well as the subcarrier. This is necessary because the $L-R$ signal cannot be recovered from the sidebands without the presence of the subcarrier.

The $L-R$ signal represented by the $L-R$ sidebands is detected by connecting a unilateral conducting device 147 between the ungrounded side of the resonant circuit 108, 110 and a junction between a potentiometer 148 and a capacitor 150, which are connected in series between ground and the junction 104 of the deemphasis network 100, 102. A movable contact 152 of the potentiometer 148 is connected to a volume control potentiometer 154. The portion of the potentiometer 148 between the movable contact 152 and the unilateral device 147 and the entire resistance of the potentiometer 154 are in parallel with the capacitor 150 and constitute a load circuit for the device 147. With the unilateral device 147 having the polarity shown, the $L-R$ signal appears at the junction between the potentiometer 148 and the capacitor 150.

The potentiometer 148 also serves the function of matrixing the $L+R$ and $L-R$ signals so as to produce a signal L. This is brought about by the fact that the signal $L+R$ appears at the upper end of the potentiometer 148 and the $L-R$ signal appears at the lower end. By suitably adjusting the contact 152 a point may be obtained where R components of the $L+R$ and $L-R$ signals have equal amplitude, thus eliminating the R components and providing a signal L at the contact 152.

The R signal is recovered by connecting a unilateral conducting device 156 between the ungrounded end of the resonant circuit 108, 110 and the junction between a potentiometer 158 and a capacitor 160, which are connected in series between ground and the junction 104 of the deemphasis network 100, 102. A volume control potentiometer 162 is connected to the movable contact 164 of the potentiometer 158 and constitutes with the lower portion thereof a load circuit for the unilateral device 156. Because the polarity of the unilateral device 156 is opposite to the polarity of the device 147, the signal appearing at the junction of the capacitor 160 and the potentiometer 158 is $R-L$. When this signal is combined in the potentiometer 158 with the $L+R$ signal which is applied to the opposite end of the potentiometer 158, a signal R is produced at the movable contact 164. The L and R signals may then be respectively applied to suitable audio amplifiers 166 and 168 thence to loudspeakers 170 and 172.

The manner in which the system just described operates so as to reduce the amount of unwanted components in the L and R signals may be explained by reference to FIGURE 2. Analysis of the distribution of energy in the video signals shows it to be centered about the line scanning frequency of 15.75 kilocycles and its harmonics as indicated by the graph 147 of FIGURE 2. If the intermediate frequency amplifier 86 of an intercarrier sound receiver could be designed so as to entirely prevent the video signals from producing amplitude modulation of the audio IF carrier of 4.5 megacycles, the distribution of energy as indicated by the graph 147 of FIGURE 2 would not matter. However, as previously indicated this is not the case, and in all practical television receivers of the intercarrier sound type the audio signals supplied to the FM detector 96 are modulated in amplitude by the video components. As is apparent from the graph 147, the greatest amplitude modulation is produced around the frequencies 15.75 kilocycles, 31.5 kilocycles and 47.25 kilocycles, etc. In previous systems the subcarrier frequency for $L-R$ signal has been coincident with one of these frequencies and consequently the amount of amplitude modulation is a maximum at the very center of the $L-R$ sidebands. Observation of FIGURE 2 shows that the subcarrier frequency of 23.625 kilocycles falls midway between the frequency of 15.75 and 31.5 kilocycles at which point the energy in the video components is at a minimum. In general the most important frequencies for audio transmission are the low frequencies and these are represented by sidebands closer to the subcarrier of 23.625 kilocycles and are therefore relatively free from amplitude modulation produced by unwanted video components. As can be seen from FIGURE 2 the sidebands of the $L-R$ signal that are furthest removed on either side of the subcarrier 23.625 kilocycles, and which represent the higher frequency audio signals, fall within frequencies where the unwanted video components have the greatest energy. A further advantage of this system arises from the deemphasis of the $L-R$ sidebands produced by the circuit 108, 110 as indicated by the dotted line 114 of FIGURE 2. It will be observed that the amplitude of the sidebands is reduced in the vicinity of the greatest video energy so that the effect of the unwanted video energy is minimized.

FIGURE 4 illustrates another transmitter embodying the principles of this invention which is very similar to that shown in FIGURE 1 and therefore corresponding components are indicated by the same numerals. Instead of supplying the mixer 62 with line synchronizing pulses, as is done in FIGURE 1, a frequency quadrupler 180 is connected between the source 54 and the mixer 62. Thus the quadrupler will supply a frequency of 63 kilocycles to the mixer 62 and the buffer amplifier 60 will provide a signal of 23.625 kilocycles. The mixer is provided with means, not shown, for selecting the difference frequency of 39.375 kilocycles which is the desired pilot carrier.

FIGURE 5 illustrates a receiver embodying the principles of this invention in which the fourth harmonic of the line scanning pulses is used to derive the subcarrier. Those components corresponding in function to the components of FIGURE 3 are designated by the same numerals and need not be further described. The take-off circuit for the pilot carrier of 39.375 kilocycles from the ratio detector includes a coupling capacitor 182 coupled from the high side of the ratio detector output to the grid 184 of a mixing amplifier 186. The selective circuit for the 39.375 kilocycle pilot carrier includes a variable inductor 188 connected between the grid 184 and ground, capcitor 190 connected in series with another capacitor 192, the series combination of capacitors being parallel with the inductor 188. The parallel circuit thus formed is tuned to select the pilot carrier frequency of 39.375 kilocycles. Pulses of line scanning frequency (15.75 kilocycles) are derived from the video section 92 and coupled via a capacitor 194 to the ungrounded end of a variable inductor 196 and thence to the cathode 200 of the mixing amplifier 186 via a capacitor 198. A capacitor 202 that is connected between the cathode 200 and the ungrounded side of the capacitor 192 as well as the capacitor 192 and the capacitor 198 form a parallel resonant network with the inductor 196 that may be tuned so as to select the fourth harmonic of the line scanning frequency that is a frequency of 63 kilocycles and apply this frequency to the cathode 200. A cathode resistor 204 provides suitable negative bias for the mixing amplifier 186. An anode 189 of the mixing amplifier 186 is supplied with positive operating potential from a battery 191 via a load resistor 193. The mixing action will produce across this resistor the sum of the pilot carrier frequency and the fourth harmonic of the line scanning frequency as well as their difference. In this case the difference frequency is the desired subcarrier frequency of 23.625 kilocycles and it is selected by the parallel resonant circuit 108, 110 by virtue of the fact that the anode 188 is connected to the high side of the resonant circuit through blocking condenser 195.

It is thus seen that the circuit just described is similar to that shown in FIGURE 3 except that the pilot carrier frequency of 39.375 kilocycles is combined with a frequency of 63 kilocycles instead of 15.75 kilocycles to provide the required 23.625 kilocycle subcarrier frequency. It is believed to be preferable to use the 63 kilocycle signal, the fourth harmonic of the line scanning frequency, rather than the line scanning frequency itself because the fundamental and second harmonic of the line scanning frequency of 15.75 kilocycles, which appear across the load resistor 193 if the line scanning frequency were used, when heterodyned or mixed with the 23.625 kilocycles subcarrier in the detectors 147 and 156 would produce an audio frequency of 7.875 kilocycles which is within the audio range of the system. On the other hand when the fourth harmonic of the line scanning frequency is used, the presence of it or its harmonics in the detector circuits produces frequencies that are far above the audio range of the system and therefore not heard.

The capacitor 190 could be returned to ground rather than to the ungrounded side of the capacitor 192 but the connection shown produces some desirable regeneration of the 39.375 kilocycles pilot carrier. This has two advantages. First, the 39.375 kilocycle voltage is accentuated at the grid 184 so as to improve excitation and consequently to provide a greater 23.625 kilocycle output. Socondly, the effective Q of the resonant circuit selecting the 39.375 kilocycle pilot carrier is increased thereby better excluding noise in the vicinity of the pilot carrier.

FIGURE 6 illustrates another receiver embodying the principles of this invention. Because many of the components perform the same functions as in the receiver of FIGURE 3 they are indicated by the same numerals. In the receiver of FIGURE 6 the $L-R$ signal represented by the sidebands of the subcarrier is detected by a balanced detector so that modulation components on the carrier itself are eliminated from the output. In the circuit of FIGURE 3 separate detector circuits were used in which the polarity of the unilateral conducting device was reversed so as to give signals which could be combined in the matrix with the $L+R$ signal in such manner as to yield the L and R signals. In the circuit of FIGURE 6 there is only one detector for deriving an $L-R$ signal and therefore it is necessary that it be combined with an $L+R$ signal to produce the L signal and a $-L-R$ signal to produce the $-$R signal. Otherwise separate balanced detectors would have to be included.

The 4.5 megacycle audio intermediate frequency carrier derived by the take-off means 94 is supplied to a frequency modulation detector having two outputs, one providing an $L+R$ signal and the other providing a $-L-R$ signal. Although many forms of frequency modulation detectors could be used it will be apparent to those skilled in the art that the particular circuit illustrated is the well-known ratio detector in which a transformer 206 is provided with a primary winding 208, a secondary winding 210 and a tertiary winding 212. Unilateral conducting devices 214, 216 and load resistors 218, 220 are connected in series with the secondary winding 210. Also included in well known manner are a stabilizing capacitor 222 and bypass capacitors 224 and 226. The 4.5 megacycle audio intermediate frequency carrier is applied to the primary winding 208. A coupling impedance comprised of a resistor 228 and a capacitor 230 is connected between the remote end of the tertiary winding 212 and ground and a bypass capacitor 232 is connected in parallel with the coupling impedance. The detected signals appearing across the coupling impedance 228, 230 will be as indicated in FIGURE 2 in which one of the signals is $L+R$. Another coupling impedance comprised of a resistor 233 and a capacitor 234 is connected between the lower end of the resistor 220 and ground and bypassed by a capacitor 236. Because of the point of connection a signal —*L*—*R* appears as one of the signals across the coupling impedance 233, 234.

As in FIGURE 3 the *L*+*R* signal is separated from the other signals appearing at the output of the frequency modulated detector by a deemphasis network comprised of a resistor 100 and a capacitor 102 and is applied to the upper end of a potentiometer 148. In a similar way, the —*L*—*R* signal is separated from the other signals by a deemphasis network comprised of resistor 302 and capacitor 304 and is applied to the upper end of a potentiometer 158.

The output of the frequency modulation detector appearing across the coupling impedances 228, 230 and 233, 234 in which the *L*—*R* sideband signals appear is coupled via capacitors 240 and 306 to a parallel network comprised of a variable inductor 242 and two capacitors 244 and 246 connected in series parallel relationship therewith. This parallel circuit is adjusted to resonate at the subcarrier frequency of 23.625 kilocycles and has a Q such as to provide deemphasis of the *L*—*R* sidebands in much the same manner as the parallel circuit 108, 110 in FIGURE 3. The subcarrier is applied to this circuit at the junction of the capacitors 244, 246 and is derived in the following manner. Pulses of line scanning frequencies such as flyback pulses are obtained from the video section 92 and coupled via a capacitor 248 to a parallel network comprised of a variable inductor 250 and two capacitors 252 and 254 connected in series parallel relationship therewith. This parallel network is tuned to resonance at the fourth harmonic of the line scanning frequency and therefore provides across the capacitors 254 and a resistor 256 which is connected in parallel therewith a voltage having a frequency of 63 kilocycles. The resistor 256 is connected to the cathode 258 of a mixing amplifier 260 and serves the additional function of providing the bias therefor. The output of the frequency modulation detector appearing across the coupling impedance 228, 230 is applied via a capacitor 262 to the grid 264 of the mixing amplifier 260. A parallel circuit comprised of an inductor 266 and a capacitor 268 is connected between the grid 264 and ground and serves to separate the pilot carrier of 39.375 kilocycles from the output of the frequency modulation detector appearing across the coupling impedance 228, 230. Positive operating potential is supplied to the anode 270 of the amplifier 260 via a resistor 272. Both the sum and difference frequencies of the 39.375 kilocycle signal applied to the grid 264 and the 63 kilocycle signal applied to the cathode 258 appear across the resistor 272 and the difference frequency, which is the desired subcarrier of 23.625 kilocycles, is selected by coupling a parallel resonant circuit comprised of a variable inductor 274 and a capacitor 276 which resonate at the subcarrier frequency to the anode 270 via a capacitor 278. The ungrounded end of the parallel resonant circuit 274, 276 is connected to the junction of the capacitors 244 and 246.

Hence it is seen that the voltage between ground and one terminal of the variable inductor 242 includes the *L*—*R* sidebands as well as the subcarrier while the voltage between the other terminal of inductor 242 and ground includes the subcarrier and the opposite phase of the *L*—*R* sideband signal. Various circuits might be used to provide a balanced detection of these sidebands, that is detection in which the modulation components on the subcarrier are repressed. One sample circuit for effecting this result is shown. It includes a resistor 280 connected between the left end of the inductor 242 and ground and a unilateral conducting device 282 connected in parallel therewith. A capacitor 284 and a load resistor 286 are connected in series in the order named between ground and the other end of the inductor 242 and a unilateral conducting device 288 is connected in shunt with the resistor 286. Because of the polarity of the connections for the unilateral conducting devices 282 and 288 it is seen that any modulation components on the subcarrier itself will create equal and opposite modulation component voltages across the load resistors 280 and 286 so that no output of these modulation components appears on the lead 290. However, for reasons well known to those skilled in the art the desired *L*—*R* signal will appear on the lead 290. From a purely theoretical point of view no energy equal to the line scanning frequency of 15.75 kilocycles should be introduced into the detector circuit. However, as a practical matter it will be found that some energy of this frequency is present in the detector and will beat with the subcarrier to produce a difference frequency of 7.875 kilocycles, which of course is within the audio range. Such a beat note if it occurs can be eliminated by inserting suitable filter in the lead 290. Although various forms of filters may be used the particular one illustrated may be recognized as a bridge-T type that includes an inductor 292 connected in parallel with series capacitors 294 and 296, the junction of the latter being connected to ground via a resistor 298. Such a network can be tuned sharply to resonance at the possible beat frequency 7.875 kilocycles, and, although it is not essential, further reduction of this beat frequency may be secured by terminating the filter in a capacitor 300 which has a finite impedance for 7.875 kilocycles. Of course, such a capacitor tends to reduce the amplitude of the *L*—*R* audio signal above the beat frequency of 7.875 kilocycles and therefore may reduce the stereophonic effects for such higher audio frequencies. However, if the filter is comprised solely of the rejection network 292, 294, 296, 298, stereophonic effects are reduced only in the rejection band and can be obtained for frequencies on either side of the beat frequency. The application of the *L*—*R* signal to the lower end of the matrixing potentiometer 148 in combination with the application of the *L*+*R* signal to the upper end of the matrixing potentiometer 148 produces an L signal on the contact arm 152 thereof which is applied via a volume control potentiometer 154 to an audio amplifier 166 and thence to a loudspeaker 170. The application of the *L*—*R* signal to the lower end of the matrixing potentiometer 158 in combination with the application of the —*L*—*R* signal to the upper end of this potentiometer produces a —R signal at its movable contact 164. This —R signal is applied to a loudspeaker 172 via a volume control potentiometer 162 and an audio amplifier 168. The fact that the signal is —R instead of +R does not produce any problem because its polarity can be changed by the simple expedient of reversing the connections between the audio amplifier and the voice coil of the speaker 172 or by any other well known means.

What is claimed is:

1. In a television system, a means for conveying stereophonic information comprising: a television transmitter including a source of periodic synchronizing signals for the televsion system, a source of L signals, a source of R signals, matrixing means for deriving from the L and R signals first and second combination signals, means for deriving a subcarrier wave having a frequency differing from the frequency of said periodic synchronizing signals and harmonic thereof and greater than the highest frequency in said first combination signal, means for amplitude modulating the subcarrier wave with said second combination signal so as to produce second combination signal sidebands in such manner that the subcarrier wave is suppressed, means for deriving a pilot carrier wave having a frequency that is greater than the highest frequency produced by said amplitude modulation means and which can be combined with said periodic synchronizing signals or harmonic thereof to produce a wave having the same frequency as the suppressed subcarrier wave; a television receiver: means for conveying said first combination signal, said amplitude modulation sidebands of the second combination signal, said pilot carrier wave and said periodic synchronizing signals from said transmitter to said receiver; said television receiver including means for segregating the first combination signal, means for segregating the second combination signal sidebands, means for segregating the pilot carrier wave, means for segregating the periodic synchronizing signals, an amplitude modulation detector, means for applying the second combination signal sidebands to said detector, means for combining the periodic synchronizing signals with said pilot carrier wave so as to regenerate the subcarrier wave, means for applying the regenerated subcarrier wave to said amplitude modulation detection means so that the output of said amplitude modulation detection means is the second combination signal, and matrixing means coupled to said means that segregates the first combination signal and to the output of said amplitude modulation detection means so as to produce segregated L and R signals.

2. In a television system, a means for conveying stereophonic information comprising: a television transmitter including a source of periodic synchronizing signals for the television system, a source of L signals, a source of R signals, matrixing means for deriving from the L and R signals first and second combination signals, means for deriving a subcarrier wave having a frequency differing from the frequency of said periodic synchronizing signals and harmonics thereof and greater than the highest frequency in said first combination signal, means for amplitude modulating the subcarrier wave with said second combination signal so as to produce second combination signal sidebands in such manner that the subcarrier wave is suppressed, means for deriving a pilot carrier wave having a frequency that is greater than the highest frequency produced by said amplitude modulation means and which can be combined with said periodic synchronizing signals or harmonics thereof to produce a wave having the same frequency as the suppressed subcarrier wave, and means for applying said first combination signal, the second combination signal sidebands, said pilot carrier wave, and said synchronizing signals to a single transmission path.

3. In a television system, a signal receiving means adapted to operate in response to signals including a periodic synchronizing signal, a first combination of L and R signals, sidebands of a suppressed subcarrier wave which represent a second combination of L and R signals, the frequency of the suppressed subcarrier wave differing from the frequency of the periodic signal and its harmonics, the sidebands being above the frequency of the first combination of L and R signals, and a pilot carrier wave having a frequency higher than the sidebands such that it can be combined with the periodic synchronizing signal or one of its harmonics to produce a wave of the subcarrier wave frequency comprising: a television receiver including means for segregating the first combination of L and R signals, means for segregating the sidebands representing the second combination of L and R signals, means for segregating the pilot carrier wave, and means for segregating the periodic synchronizing signal, an amplitude modulation detection means, means for applying the sidebands to said detection means, means for combining the pilot carrier wave, and the periodic synchronizing of signal or one of its harmonics so as to regenerate the subcarrier wave, means for applying the subcarrier wave to said amplitude modulation detection means so that the detected output thereof is the second combination of L and R signals; a matrix coupled to the means for segregating the first combination of the L and R signals and to the output of said amplitude modulation detection means for deriving segregated L and R signals.

4. In a television system, a means for conveying stereophonically related audio information comprising: a television transmitter including a source of line synchronizing signals of frequency $f_s$ for the television system; a source of L signals; a source of R signals; matrixing means for deriving $(L+R)$ and $(L-R)$ combination signals from said L and R signals; circuit means for deriving from said line synchronizing signals a subcarrier wave having a frequency $f_{sc}$, said frequencies $f_s$ and $f_{sc}$ having the relation $$(n+1)f_s>f_{sc}>n\times f_s$$

where $n$ is an integer, said frequency $f_{sc}$ also having a value greater than the highest frequency contained in said $(L+R)$ signal; means for amplitude modulating said subcarrier wave with said $(L-R)$ signal so as to produce $(L-R)$ signal sidebands in such manner that the subcarrier wave is suppressed; means for deriving from said synchronizing signal a signal wave having a frequency $n\times f_s$ where $n$ is an integer, circuit means for mixing said signal wave of frequency $n\times f_s$ and said subcarrier wave for providing a pilot carrier wave having a frequency $f_p$ which is greater than the highest frequency in said $(L-R)$ signal sidebands produced by said amplitude modulation means; a television receiver; means for conveying said synchronizing signal, said $(L+R)$ signal, said $(L-R)$ signal sidebands and said pilot signal from said transmitter to said receiver; said television receiver including means for segregating said $(L+R)$ signal, said $(L-R)$ signal sidebands, said pilot signal and said synchronizing signal; an amplitude modulation detector; means for applying the $(L-R)$ signal sidebands to the detector; means for combining said pilot signal and said synchronizing signal so as to regenerate the subcarrier wave; means for applying the regenerated subcarrier wave to said amplitude modulation detector so that the output of said amplitude modulation detector is the $(L-R)$ signal; and matrixing means for combining said $(L+R)$ and $(L-R)$ signals so as to provide segregated L and R signals.

5. In a television system a means for transmitting stereophonically related audio information comprising: a television transmitter including a source of line synchronizing signals of frequency $f_s$ for the television system, a source of L signals, a source of R signals, matrixing means for deriving $(L+R)$ and $(L-R)$ combination signals from said L and R signals, circuit means for deriving from said line synchronizing signals a subcarrier wave having a frequency $f_{sc}$, said frequencies $f_s$ and $f_{sc}$ having the relation $$(n+1)\times f_s>f_{sc}>n\times f_s$$

where $n$ is an integer, said frequency $f_{sc}$ also having a value greater than the highest frequency contained in said $(L+R)$ signal, a balanced amplitude modulator circuit for providing as an output signal sidebands representing sidebands of amplitude modulation of said subcarrier wave by said $(L-R)$ signal and for providing suppression of said subcarrier wave, means coupling said $(L-R)$ signal and said subcarrier wave to said amplitude modulator circuit, means for deriving from said synchronizing signal a signal wave having a frequency $n\times f_s$ where $n$ is an integer, and circuit means for combining said signal wave of frequency $n\times f_s$ and said subcarrier wave for providing a pilot carrier wave having a frequency $f_p$ which is greater than the highest frequency contained in said $(L-R)$ sidebands.

6. In a television system, a signal receiving means adapted to operate in response to signals which contain encoded stereophonically related audio information, the signals including a periodic synchronizing signal of frequency $f_s$, an $(L+R)$ signal, sidebands of a suppressed subcarrier wave which represent an $(L-R)$ signal, and a pilot carrier wave, the suppressed subcarrier wave having a frequency $f_{sc}$, the frequencies $f_s$ and $f_{sc}$ having the relation $$(n+1)\times f_s>f_{sc}>n\times f_s$$

where $n$ is an integer, the lowest frequency of the $(L-R)$ sidebands having a value greater than the value of the highest frequency contained in the $(L+R)$ signal, the pilot carrier wave having a value of frequency $f_p$ greater than the highest frequency in the $(L-R)$ sidebands and which can be combined with a signal wave of frequency $n \times f_s$, where $n$ is an integer, to produce a wave of subcarrier frequency $f_{sc}$, comprising: a television receiver including means for segregating said $(L+R)$ signal, said $(L-R)$ sidebands, and said pilot carrier wave, means for segregating said periodic synchronizing signal and for providing a signal wave of frequency $n \times f_s$ where $n$ is an integer, circuit means for combining said pilot carrier wave and said signal wave of frequency $n \times f_s$ for providing an output signal wave having a subcarrier frequency $f_{sc}$, an amplitude modulation detector circuit, means coupling said segregated $(L-R)$ sidebands and said output signal of subcarrier frequency $f_{sc}$ of said circuit combining means to said detector circuit so that the output of said detector circuit is the $(L-R)$ signal, and circuit matrixing means for combining said $(L+R)$ and $(L-R)$ signals so as to provide segregated L and R signals.

References Cited in the file of this patent

UNITED STATES PATENTS

| | | |
|---|---|---|
| 2,619,547 | Ross | Nov. 25, 1952 |
| 2,698,379 | Boelens et al. | Dec. 28, 1954 |

OTHER REFERENCES

"Stereophonic T.V. Sound," Electronics, Oct. 30, 1959 (page 64 relied on).